United States Patent
Knittel et al.

(10) Patent No.: US 10,259,501 B2
(45) Date of Patent: Apr. 16, 2019

(54) VEHICLE FRAME

(71) Applicant: Ford Global Technologies, LLC, Dearborn, MI (US)

(72) Inventors: John Martin Knittel, Canton, MI (US); Marwan Ahmad Elbkaily, Canton, MI (US); Dan Joseph McCarthy, Northville, MI (US); Jungmao Michael Chang, Novi, MI (US); Amar Ourchane, Dearborn, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 138 days.

(21) Appl. No.: 15/408,546

(22) Filed: Jan. 18, 2017

(65) Prior Publication Data

US 2018/0201320 A1    Jul. 19, 2018

(51) Int. Cl.
  *B62D 21/02*    (2006.01)
  *B62D 21/15*    (2006.01)
  (Continued)

(52) U.S. Cl.
  CPC .............. *B62D 21/02* (2013.01); *B62D 21/09* (2013.01); *B62D 21/15* (2013.01); *B62D 21/152* (2013.01); *B62D 25/08* (2013.01); *B62D 25/082* (2013.01); *B62D 25/088* (2013.01); *B62D 27/023* (2013.01); *B62D 29/007* (2013.01); *B62D 33/077* (2013.01); *B60Y 2200/14* (2013.01); *Y10T 29/49622* (2015.01)

(58) Field of Classification Search
  CPC ...... B62D 21/02; B62D 21/15; B62D 21/152; B62D 21/155; B62D 21/09; B62D 33/077; B62D 29/007; B62D 27/00; B62D 27/02; B62D 27/023; B62D 25/08; B62D 25/082; B62D 25/088; B60Y 2200/14; Y10T 29/49622
  USPC .............. 280/781, 784, 785, 797, 798, 800; 29/897.2; 296/187.03, 187.09, 187.11, 296/204, 205; 180/311, 312
  See application file for complete search history.

(56) References Cited

U.S. PATENT DOCUMENTS

RE20,197 E  * 12/1936  Crowe ................... B62D 21/00
                                                      228/170
7,341,299 B1    3/2008  Baccouche et al.
(Continued)

FOREIGN PATENT DOCUMENTS

CN          202294968 U     7/2012

OTHER PUBLICATIONS

Data sheet for AISI Carbon Steel, http://www.efunda.conn/Materials/alloys/carbon_steels/show_carbon.cfm?ID=AISI_1025&show_prop=all&Page_Title=AISI%201025, Jul. 28, 2018.*
(Continued)

*Primary Examiner* — Keith J Frisby
(74) *Attorney, Agent, or Firm* — Ray Coppiellie; Bejin Bieneman PLC

(57) ABSTRACT

A vehicle frame for a vehicle includes a rail and an engine cradle. The rail has a front portion, a rear portion spaced from the front portion, and a middle portion between the front portion and the rear portion. The engine cradle is transversely attached to the front portion. The front portion and the rear portion are each welded to the middle portion. The middle portion has a gauge thinner than a gauge of the front portion.

20 Claims, 5 Drawing Sheets

(51) Int. Cl.
    *B62D 21/09*     (2006.01)
    *B62D 33/077*     (2006.01)
    *B62D 27/02*     (2006.01)
    *B62D 25/08*     (2006.01)
    *B62D 29/00*     (2006.01)

(56) References Cited

U.S. PATENT DOCUMENTS

| | | | |
|---|---|---|---|
| 7,543,384 B2 | 6/2009 | Ni et al. | |
| 7,695,052 B2 | 4/2010 | Nusier et al. | |
| 8,231,166 B2 | 7/2012 | Mori | |
| 9,045,162 B2 | 6/2015 | Marten et al. | |
| 9,211,913 B2 | 12/2015 | Ohta | |
| 2002/0163173 A1* | 11/2002 | Ruehl | B62D 21/07 280/781 |
| 2009/0267337 A1* | 10/2009 | Siekaup | B62D 21/02 280/781 |

OTHER PUBLICATIONS

Calik et al., "Effect of Carbon Content on the Mechanical Properites of Medium Carbon Steels", http://www.znaturforsch.com/s65a/s65a0468.pdf, Jul. 17, 2009.*

"Laser Beam Welding", https://en.wikipedia.org/wiki/Laser_beam_welding, Jul. 28, 2018.*

* cited by examiner

VEHICLE FRAME

BACKGROUND

Motor vehicles may have a body-on-frame construction or a unibody construction. For a body-on-frame construction, a vehicle frame supports a body that is a separate component from the vehicle frame. The body covers and is attached to the vehicle frame. For a unibody construction, a chassis and a body of the vehicle are a single component.

DETAILED DESCRIPTION

Figure 1:
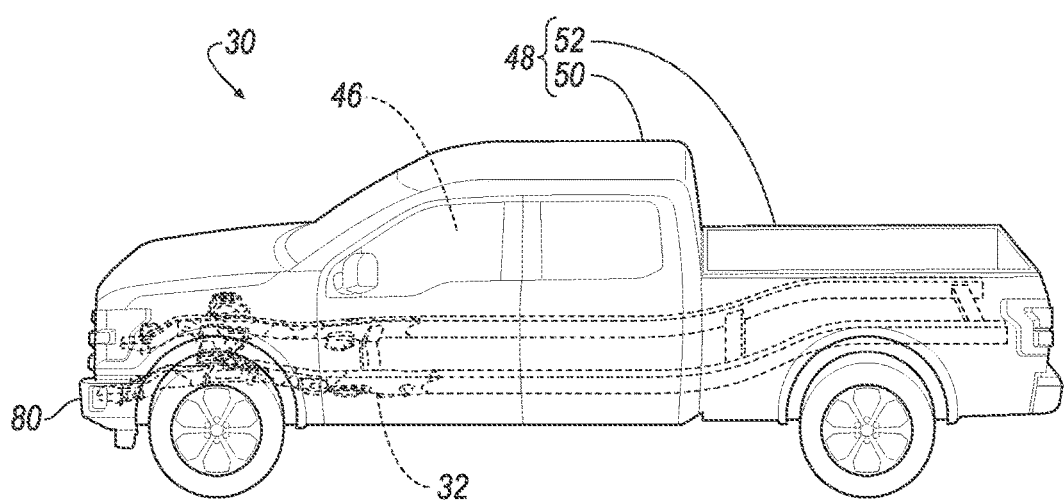
FIG. 1 is a perspective view of a vehicle.

With reference to the Figures, wherein like numerals indicate like parts throughout the several views, a vehicle frame 32 for a vehicle 30 includes a rail 34 and an engine cradle 40. The rail 34 has a front portion 36, a rear portion 44 spaced from the front portion 36, and a middle portion 42 between the front portion 36 and the rear portion 44. The engine cradle 40 is transversely attached to the front portion 36. The front portion 36 and the rear portion 44 are each welded to the middle portion 42. The middle portion 42 has a gauge thinner than a gauge of the front portion 36. ("Front," "middle," and "rear" denote a relative ordering with respect to a vehicle-forward direction but not necessarily placement within the vehicle 30. For example, the front portion 36, middle portion 42, and rear portion 44 may all be in a front half of the vehicle 30.)

The vehicle frame 32 provides beneficial energy absorption in the event of a frontal impact. During a frontal impact, the middle portion 42 with the thinner gauge may yield before the front portion 36 and/or the rear portion 44. The yielding of the middle portion 42 may reduce the magnitude of the pulse associated with the impact. The yielding of the middle portion 42 may also reduce the amount of energy transferred to a passenger cabin 46 of the vehicle 30 and any occupants within the passenger cabin 46. During an impact, the timing of the yielding of the middle portion 42 may reduce intrusion of other components into the passenger cabin 46.

With reference to FIG. 1, the vehicle 30 may be a pickup truck. The vehicle 30 has a body-on-frame construction; in other words, the vehicle frame 32 supports a body 48 that is a separate component from the vehicle frame 32. If the vehicle 30 is a pickup truck, the body 48 may include a separate cab 50 and cargo bed 52 or a body 48 that is integral, that is, a single piece.

Figure 2:
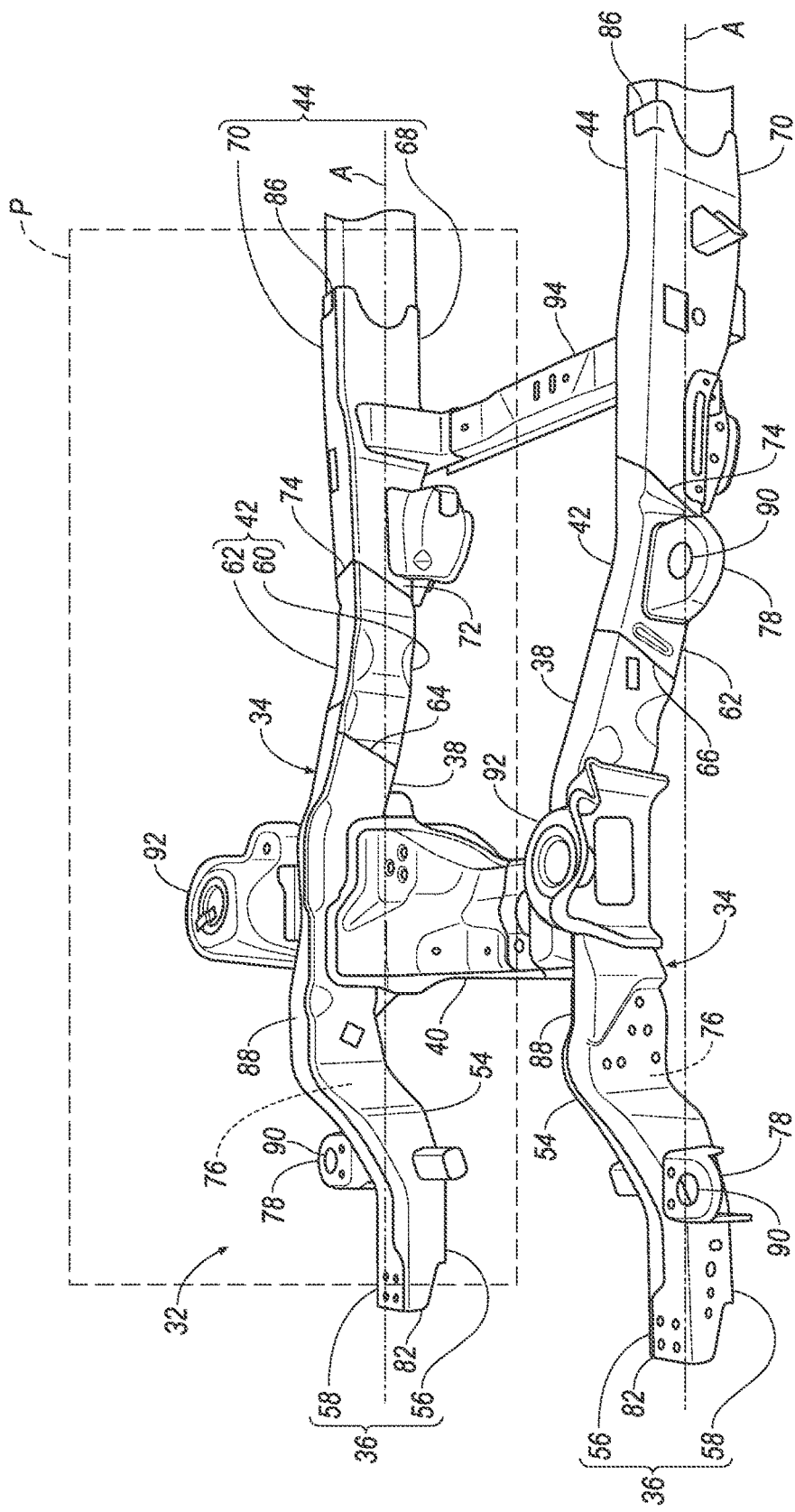
FIG. 2 is a perspective view of a portion of a vehicle frame of the vehicle.
Figure 3:
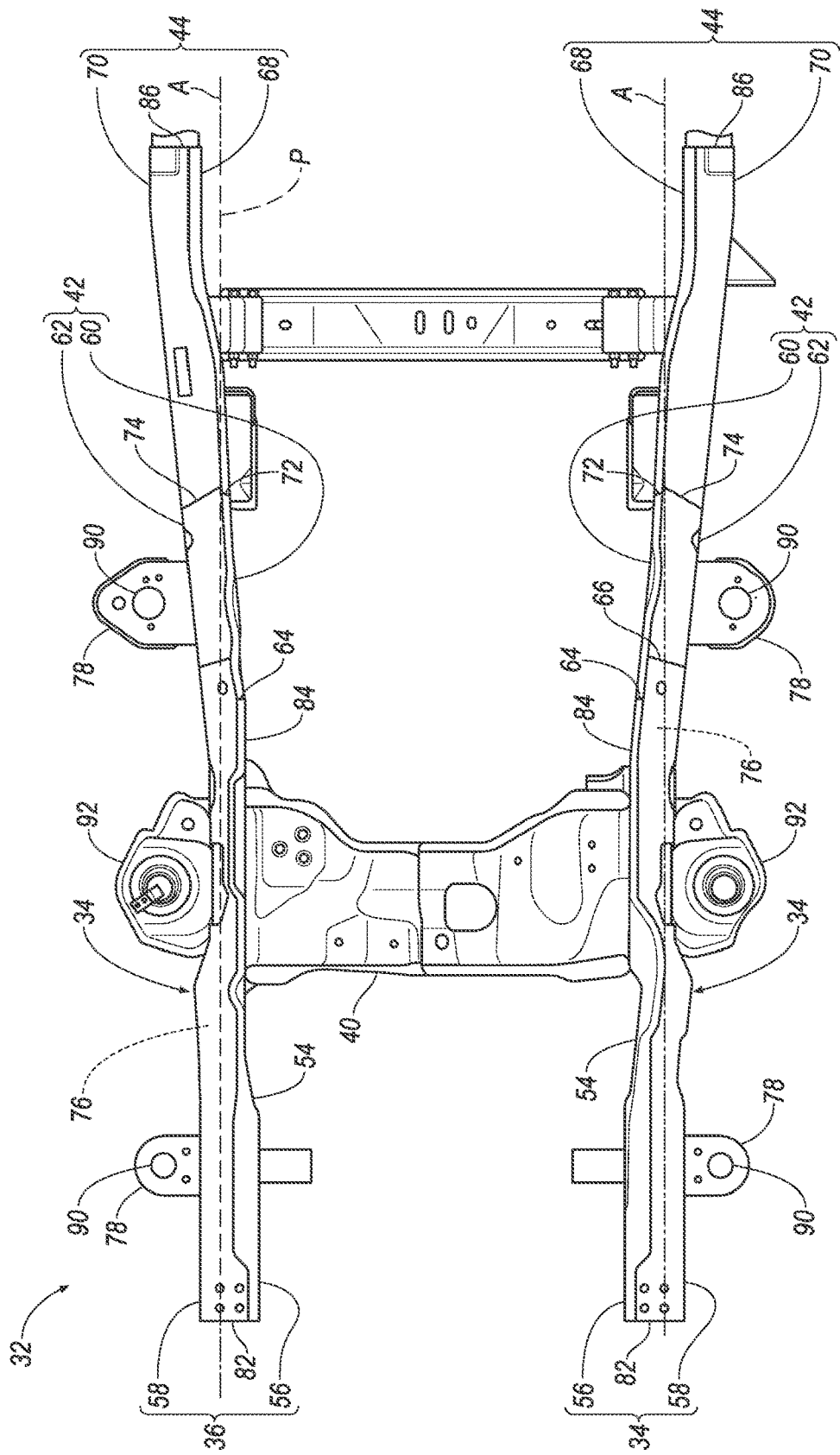
FIG. 3 is a top view of the portion of the vehicle frame.
Figure 4:
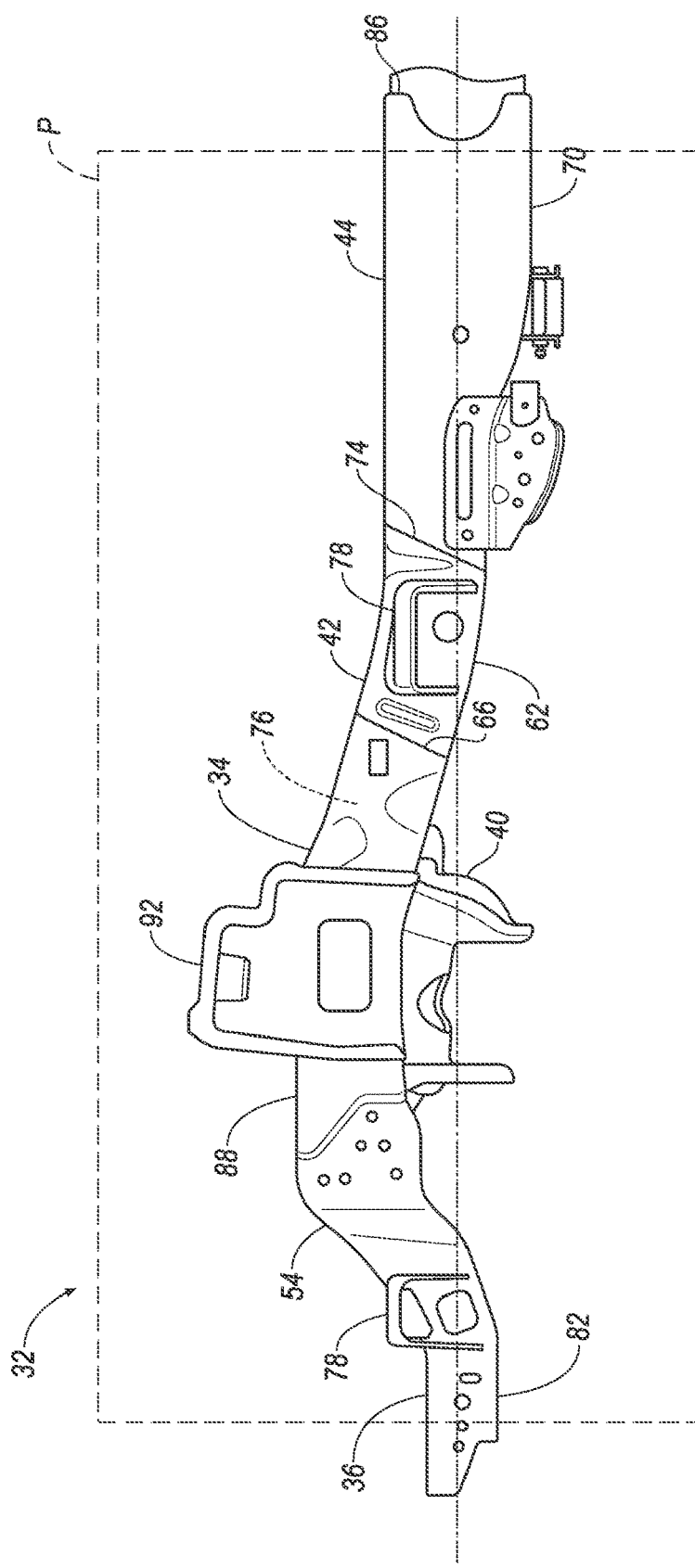
FIG. 4 is a side view of the portion of the vehicle frame.
Figure 5:
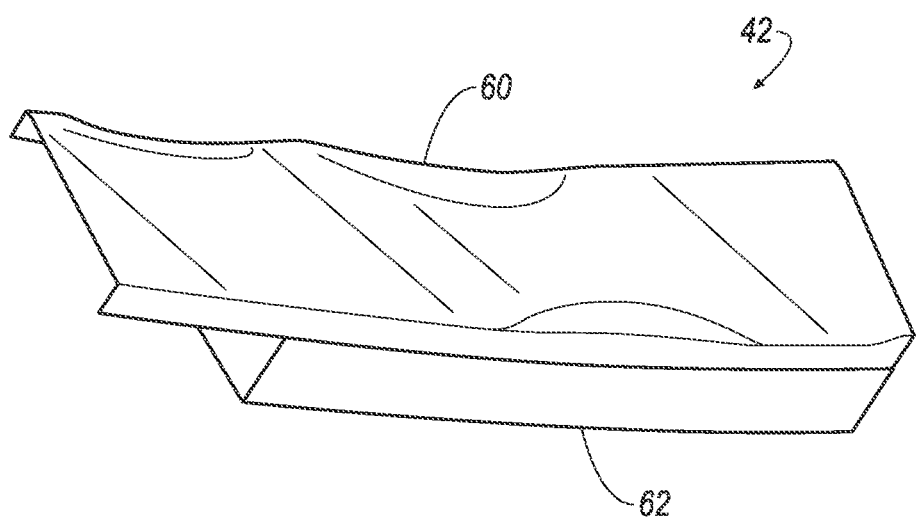
FIG. 5 is a perspective view of an underside of a middle portion of a rail of the vehicle frame.

With reference to FIGS. 2-4, the vehicle frame 32 includes two rails 34. The two rails 34 each has the front portion 36, the middle portion 42, and the rear portion 44. The front portion 36, the middle portion 42, and the rear portion 44 of the rail 34 may be attached together in series, that is, the front portion 36 is attached to the middle portion 42, the middle portion 42 is attached to the rear portion 44, and the front portion 36 is spaced from, i.e., not attached to or abutting, the rear portion 44. Each rail 34 may define an axis A. Each rail 34 may have a front end 82 of the front portion 36 and a rear end 86 of the rear portion 44 that are both parallel to the axis A. Each rail 34 may have a curve 88 between the front end 82 and the rear end 86. The curve 88 may be oriented in a plane P including the axis A and orthogonal to the engine cradle 40. In other words, the curve 88 may be in the plane P oriented vertically and in a vehicle-forward direction.

Each front portion 36 extends from the front end 82 to a rear end 84 of the front portion 36. Each front portion 36 may have a double-curve shape 54 in the plane P in which the front end 82 is parallel to the axis A, an upward-facing (concave-up) segment of the double-curve shape 54 extends from the front end 82, and a downward-facing (concave-down) segment of the double-curve shape 54 extends from the upward-facing segment to the rear end 84.

Each front portion 36 may include an inner front portion 56 and an outer front portion 58 welded together. The outer front portion 58 may be disposed outboard relative to the inner front portion 56; that is, the inner front portion 56 may be between the outer front portion 58 and the engine cradle 40.

The vehicle frame 32 includes two middle portions 42. Each middle portion 42 may include an inner middle portion 60 and an outer middle portion 62 welded together. The outer middle portion 62 may be disposed outboard relative to the inner middle portion 60; that is, the inner middle portion 60 may be between the outer middle portion 62 and the engine cradle 40.

With continued reference to FIGS. 2-4, each middle portion 42 is welded to the rear end 84 of one of the front portions 36. A weld seam 64 may connect the inner front portion 56 and the inner middle portion 60, and a weld seam 66 may connect the outer front portion 58 and the outer middle portion 62. The weld seam 64 connecting the inner front portion 56 with the inner middle portion 60 may be spaced from the weld seam 66 connecting the outer front portion 58 with the outer middle portion 62; in other words, the weld seams 64, 66 do not line up. The rail 34 is thus stronger because no continuous seam extends around the tube shape of the rail 34 and because no point has all four welded components joined together.

Each middle portion 42 may be laser-welded to the rear end 84 of one of the front portions 36. Laser welding involves joining components by using a laser to melt edges of the components together along the weld seam.

With reference to FIGS. 2-5, the vehicle frame 32 includes two rear portions 44. Each rear portion 44 may include an inner rear portion 68 and an outer rear portion 70 welded together. The outer rear portion 70 may be disposed outboard relative to the inner rear portion 68; that is, the inner rear portion 68 may be between the outer rear portion 70 and the engine cradle 40.

Each rear portion 44 is welded to one of the middle portions 42. Each rear portion 44 may be laser-welded to one of the middle portions 42. A weld seam 72 may connect the inner middle portion 60 and the inner rear portion 68, and a weld seam 74 may connect the outer middle portion 62 and the outer rear portion 70. The weld seam 72 connecting the inner middle portion 60 with the inner rear portion 68 may be spaced from the weld seam 74 connecting the outer middle portion 62 with the outer rear portion 70; in other words, the weld seams 72, 74 may not line up.

With reference to FIGS. 2-4, the rail 34 is tubular. In other words, each set of one front portion 36, one middle portion 42, and one rear portion 44 form a continuous tube. A single cavity 76 extends through the front portion 36, the middle portion 42, and the rear portion 44. The cavity 76 is circumscribed by the inner and outer front portion 56, 58, by the inner and outer middle portion 60, 62, and the inner and outer rear portion 68, 70.

The middle portions 42 have a thinner gauge than the front portions 36 and a thinner gauge than the rear portions 44. The front portions 36 and rear portions 44 may have gauges in a range from 3.6 millimeters to 4.4 millimeters, or approximately 4.0 millimeters. The middle portions 42 may have gauges in a range from 2.2 millimeters to 3.2 millimeters. A gauge of the inner middle portion 60 may be less than a gauge of the outer middle portion 62; more specifically, the gauge of the inner middle portion 60 may be approximately 2.6 millimeters, and the gauge of the outer middle portion 62 may be approximately 2.8 millimeters.

"Gauge" means a thickness of a sheet forming a component (not a thickness of the component as a whole). For a tubular component, the gauge is therefore a wall thickness of the component. For a component having a differing sheet or wall thickness, the gauge may be an average gauge weighted by a surface area of the sheet or wall; for example, the gauge of the middle portion 42 may be the gauge of the inner middle portion 60 multiplied by a surface area of a sheet forming the inner middle portion 60, plus the gauge of the outer middle portion 62 multiplied by a surface area of a sheet forming the outer middle portion 60, all divided by a sum of the two surface areas.

The front portions 36, middle portions 42, and rear portions 44 may be formed of any material suitably strong for use as the vehicle frame 32. The material of the front portion 36 may have a higher yield strength than the material of the middle portion 42, and the material of the rear portion 44 may have a higher yield strength than the material of the middle portion 42.

For example, the front portions 36, middle portions 42, and rear portions 44 may be formed of steel. The steel of the front portions 36 and rear portions 44 may be high-strength steel, and the steel of the middle portions 42 may be a mild steel. The steel of the front portions 36 and the rear portions 44 may have yield strengths in a range from 45 kilopounds per square inch (ksi) to 55 ksi, or approximately 50 ksi. The steel of the middle portion 42 may have a yield strength in a range from 30 ksi to 40 ksi, or approximately 35 ksi.

The engine cradle 40 is attached to and extends transversely from each rail 34, specifically, the curve 88 of the rail 34. The engine 40 cradle may be attached to and extend transversely from each front portion 36. The engine cradle 40 extends from one rail 34 to the other rail 34, specifically, from one front portion 36 to the other front portion 36. The engine cradle 40 may support an engine (not shown). The engine cradle 40 is attached to the front portions 36 in any suitable manner; for example, the engine cradle 40 may be welded or fastened to the front portions 36.

A cross beam 94 may be attached to and extend transversely from each rail 34, specifically, each rear portion 44. The cross beam 94 is attached to the rear portions 44 in any suitable manner; for example, the cross beam 94 may be welded or fastened to the rear portions 44.

With continued reference to FIGS. 2-4, the vehicle frame 32 includes cab mount brackets 78 having holes 90. The cab mount brackets 78 may be used for mounting the cab 50 to the vehicle frame 32. The cab mount brackets 78 may support the cab 50, which may be mounted on the cab mount brackets 78. The cab 50 may include the passenger cabin 46 for occupants. Specifically, a cab mount pad (not shown) having a hole is coupled atop each cab mount bracket so that the hole of the cab mount pad is aligned with the hole 90 of the cab mount bracket 78. The cab mount pad may be formed of any material appropriately resilient and sufficiently strong for securely mounting the cab 50 to the vehicle frame 32 while also helping to insulate the passenger cabin 46 from forces transferred from the vehicle frame 32. A pin (not shown) fits through the hole of the cab mount pad and the hole 90 of the cab mount bracket 78 to attach the cab 50 to the vehicle frame 32.

Each cab mount bracket 78 may be attached to the rail 34, that is, to one or more of the front portion 36, the middle portion 42, and the rear portion 44. The cab mount brackets 78 may be attached to the front portions 36 between the front end 82 and the engine cradle 40, or more specifically between the double-curve shape 54 and the front end 82. The cab mount brackets 78 may be mounted on the outer front portions 58, or outboard of the front portions 36, that is, such that the front portions 36 are disposed between the engine cradle 40 and the cab mount brackets 78. The cab mount brackets 78 may be attached to the middle portions 42, specifically to the outer middle portions 62, or outboard of the middle portions 42, that is, such that the middle portions 42 are disposed between the engine cradle 40 and the cab mount brackets 78.

The vehicle frame 32 may include shock tower brackets 92. The shock tower brackets 92 may accept shocks (not shown) of a suspension system of the vehicle 30. The shock tower brackets 92 may be attached to the rails 34. The shock tower brackets 92 may be disposed on outboard sides of the rails 34. The shock tower brackets 92 may be attached to the front portions 36, specifically the outer front portions 58. The shock tower brackets 92 may be aligned with the engine cradle 40; specifically, the shock tower brackets 92 may be attached to the front portions 36 opposite the engine cradle 40. The shock tower brackets 92 may be attached to the rail 34 on the curve 88.

In the event of a frontal impact with an impactor, kinetic energy is transferred from the impactor to the vehicle 30. Some of the energy may be absorbed by a bumper 80 and/or crush cans (not shown) and/or other components at a front of the cab 50. Some of the energy may be transferred to one or both of the front ends 82 of the front portions 36 of the rails 34. The front portions 36 may deform by bending, with the bending occurring in the double-curve shape 54. The bending deformation absorbs some of the energy. Some of the remaining energy may be absorbed by buckling deformation of the middle portions 42. Because the middle portions 42 have a thinner gauge and/or are lower strength than the front portions 36 and the rear portions 44, the middle portions 42 may deform by buckling before the front portions 36 and rear portions 44 deform by buckling. The deformation of the middle portions 42 may absorb some or all of the kinetic energy before that energy is transmitted to occupants in the cab 50, thus possibly reducing the likelihood and/or severity of injury by the occupants. Moreover, deformation of components of the vehicle 30 in the vicinity of the middle portions 42 may be less likely to cause injury to occupants than deformation of components of the vehicle 30 in the vicinity of the front portions 36 or rear portions 44.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A vehicle frame comprising:
    a rail having a front portion, a rear portion spaced from the front portion, and a middle portion between the front portion and the rear portion;
    an engine cradle attached to and extending transversely from the front portion;
    the front portion and the rear portion each being welded to the middle portion; and
    the middle portion having a gauge thinner than a gauge of the front portion;
    wherein the front portion includes an inner front portion and an outer front portion welded together, and the middle portion includes an inner middle portion and an outer middle portion welded together; and
    a weld seam connecting the inner front portion with the inner middle portion is spaced from a weld seam connecting the outer front portion with the outer middle portion.

2. The vehicle frame of claim 1, wherein the gauge of the middle portion is thinner than a gauge of the rear portion.

3. The vehicle frame of claim 2, wherein the gauges of the front portion and the rear portion are each in a range from 3.6 mm to 4.4 mm.

4. The vehicle frame of claim 3, wherein the gauge of the middle portion is in a range from 2.2 mm to 3.2 mm.

5. The vehicle frame of claim 1, wherein the rail is tubular.

6. The vehicle frame of claim 1, wherein the material of the front portion has higher yield strength than the material of the middle portion.

7. The vehicle frame of claim 6, wherein the material of the rear portion has higher yield strength than the material of the middle portion.

8. The vehicle frame of claim 7, wherein the material of the front portion and the material of the rear portion have yield strengths in a range from 45 ksi to 55 ksi.

9. The vehicle frame of claim 8, wherein the material of the middle portion has a yield strength in a range from 30 ksi to 40 ksi.

10. The vehicle frame of claim 7, wherein the front portion, the middle portion, and the rear portion are each steel.

11. The vehicle frame of claim 1, wherein the middle portion is laser-welded to the rear end of the front portion.

12. The vehicle frame of claim 1, wherein the inner middle portion is between the engine cradle and the outer middle portion, and the inner middle portion has a gauge less than a gauge of the outer middle portion.

13. The vehicle frame of claim 1, further comprising a cab mount bracket attached to the middle portion.

14. The vehicle frame of claim 1, further comprising:
    a second rail having a front portion, a rear portion spaced from the front portion, and a middle portion between the front and portion and the rear portion;
    wherein the engine cradle is attached to and extends transversely from the front portion of the second rail;
    the front portion and the rear portion of the second rail are welded to the middle portion of the second rail; and
    the middle portion of the second rail has a gauge thinner than a gauge of the front portion of the second rail.

15. The vehicle frame of claim 1, wherein an edge of the inner front portion and an edge of the outer front portion are welded together, an edge of the inner middle portion and an edge of the outer middle portion are welded together, an edge of the inner front portion and an edge of the inner middle portion are welded together, and an edge of the outer front portion and an edge of the outer middle portion are welded together.

16. The vehicle frame of claim 1, further comprising:
    two front-portion weld seams connecting edges of the inner front portion to edges of the outer front portion, the front-portion weld seams oriented longitudinally along the rail; and
    two middle-portion weld seams connecting edges of the inner middle portion to edges of the outer middle portion, the middle-portion weld seams oriented longitudinally along the rail.

17. A vehicle frame comprising:
    a rail having a front portion, a rear portion spaced from the front portion, and a middle portion between the front portion and the rear portion;
    the front portion and the rear portion each being welded to the middle portion; and
    the middle portion having a gauge thinner than a gauge of the front portion;
    wherein the front portion includes an inner front portion and an outer front portion welded together, and the middle portion includes an inner middle portion and an outer middle portion welded together; and
    a weld seam connecting the inner front portion with the inner middle portion is spaced from a weld seam connecting the outer front portion with the outer middle portion.

18. The vehicle frame of claim 17, wherein the material of the front portion has higher yield strength than the material of the middle portion.

19. A vehicle frame comprising:
    a rail having a front portion, a rear portion spaced from the front portion, and a middle portion between the front portion and the rear portion;
    the front portion and the rear portion each being welded to the middle portion; and
    the material of the front portion having higher yield strength than the material of the middle portion;
    wherein the front portion includes an inner front portion and an outer front portion welded together, and the middle portion includes an inner middle portion and an outer middle portion welded together; and
    a weld seam connecting the inner front portion with the inner middle portion is spaced from a weld seam connecting the outer front portion with the outer middle portion.

20. The vehicle frame of claim 19, wherein the material of the rear portion has higher yield strength than the material of the middle portion.

\* \* \* \* \*